June 1, 1926.
F. W. HENRIKSON
COUPLING DEVICE FOR CARS
Filed Nov. 12, 1923
1,587,230
2 Sheets-Sheet 1
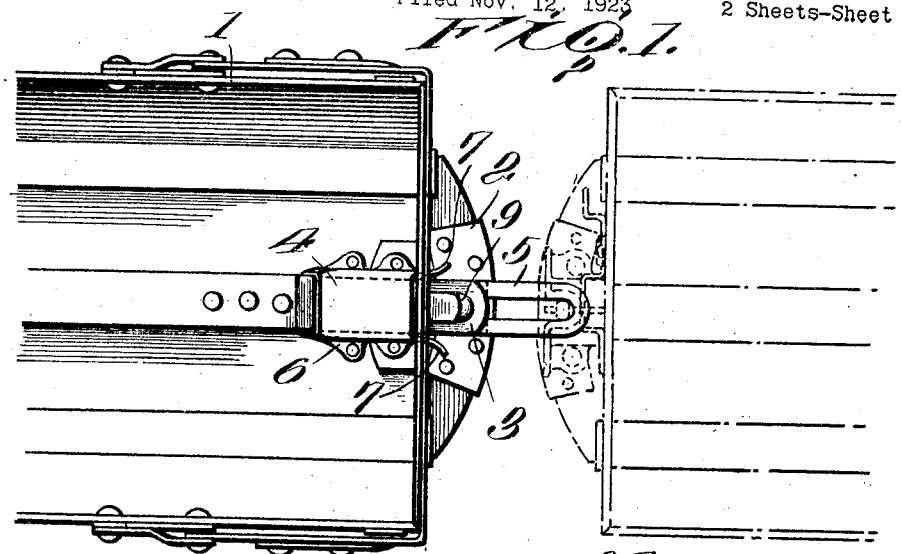
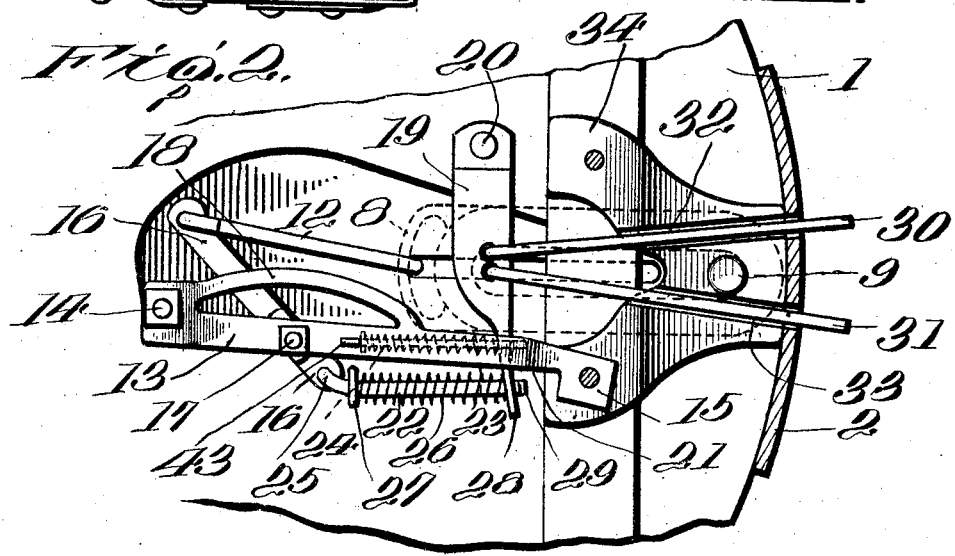
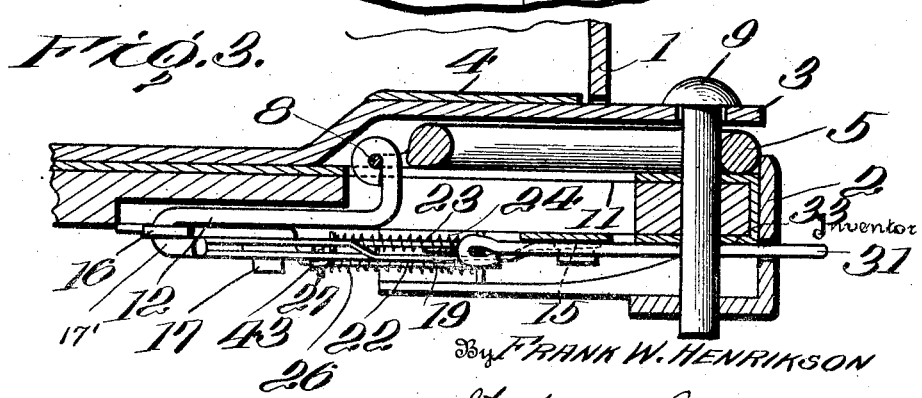
Inventor
By FRANK W. HENRIKSON
Sturtevant & Mason
Attorneys

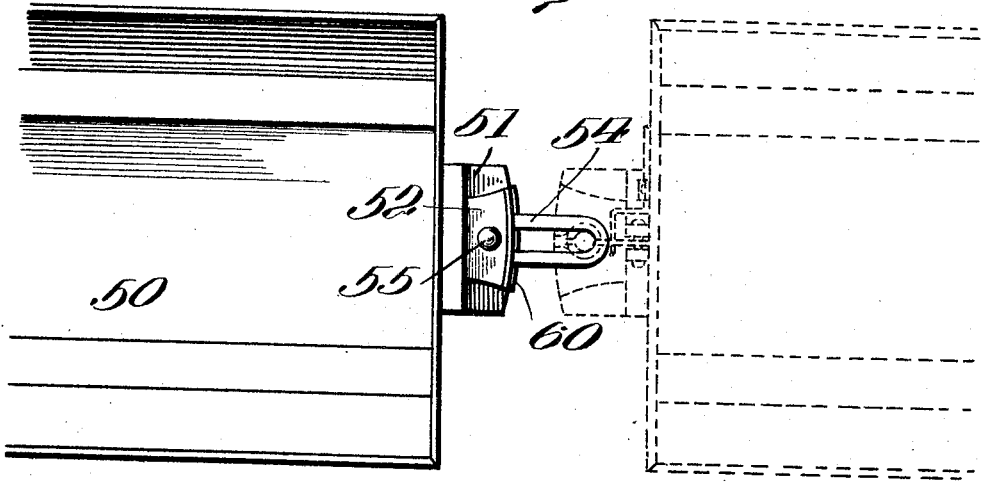
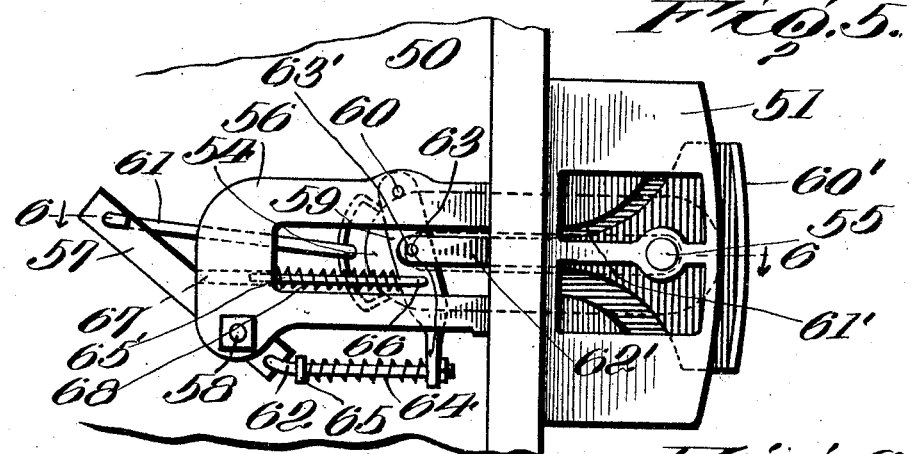
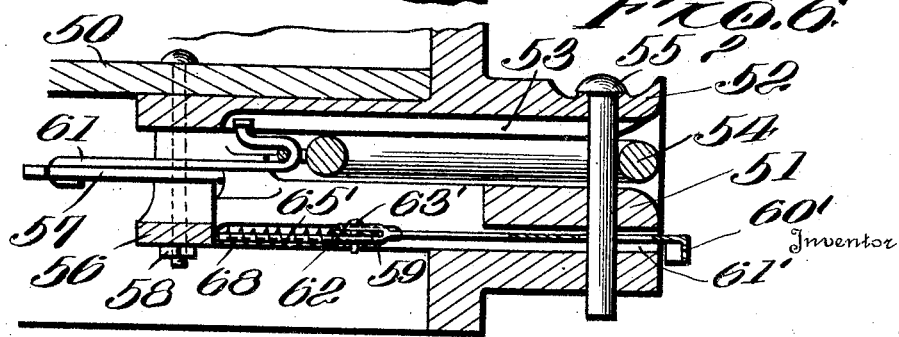

Patented June 1, 1926.

1,587,230

UNITED STATES PATENT OFFICE.

FRANK W. HENRIKSON, OF MULBERRY, KANSAS.

COUPLING DEVICE FOR CARS.

Application filed November 12, 1923. Serial No. 674,315.

This invention relates to coupling devices for railway cars, and more particularly to improved devices for automatically projecting the coupling member outwardly from the car body into easy coupling position upon the occurrence of the usual bumping together of the cars to be coupled.

The invention disclosed herein consists in certain improvements in the construction shown in my prior application filed August 2, 1923, Serial No. 655,297, for projecting the link member of the coupling mechanism outwardly from the car body on the occurrence of a coupling collision with another car equipped with a cooperating coupling device.

In the construction set forth in this prior pending application, the link is adapted to be slid outwardly centrally from the drawhead by means of a plunger projecting from the bumper, which plunger is located at one side of the bumper or laterally with respect of the line of projection of the link. The disadvantage of such a location of this plunger resides in the fact that if the two cars to be coupled, contact while on a curve, if the curve be disposed so that those respective sides of the bumpers which contact are on the plunger side of the median line through the plungers, the coupling will be effected, but if the curve be reversely disposed, the plunger will not be struck and the coupler not operated.

One of the objects of the present invention resides in arranging the coupling mechanism and the plunger with respect to the bumper so that the coupler will be operated irrespective of the angle of contact of the cars.

Another object of the invention resides in a rearrangement of the link projecting mechanism whereby to provide a more positive operation and a more compact and durable construction.

Still another object of the invention resides in an improved arrangement of the safety spring for yieldingly projecting the link outwardly so that in case of contact with another car, when the link is outwardly positioned, the coupling mechanism will not be injured.

These and other objects will be apparent from a perusal of the accompanying specification when taken in connection with the accompanying drawings, wherein—

Figure 1 is a plan view of one form of my improved two plunger link projecting mechanism shown in coupled position with another car;

Fig. 2 is a bottom plan view of the link projecting mechanism with the casing plate removed;

Fig. 3 is a side view thereof with certain parts in section;

Fig. 4 is a modification of the link projecting plunger construction;

Fig. 5 is a view thereof similar to that shown in Fig. 2, and

Fig. 6 is a view thereof similar to that disclosed in Fig. 3.

Referring now to the drawings in detail, the railway car 1 which is shown herein for purposes of illustration as the usual type of mine car, is provided with the bumper 2 and drawhead 3. The draw bar 4 arranged on the upper floor of the car 1 is recessed as in my construction set forth in my prior application, to provide a housing for the disappearing link 5. This recess is sufficiently wide to permit the link 5 to freely slide in and out and to be guided by the inner walls of the recessed drawhead as shown in dotted lines 6 in Fig. 1. The walls of the drawhead forming this recess are flared outwardly at the mouth thereof as at 7 to enable the link to swing laterally to accommodate the coupler to a curvilinear track. The link 5 which slides in this drawhead 4 is provided at its rear with laterally extending eyes 8 for connection to the link operating rod to be described. This eye is made of sufficient width to permit lateral play necessary to the proper projection of the link, and its lateral swing when coupling around curves. At the front, the link is guided by the usual pin 9 which passes centrally through the bumper 2, drawhead 3 and is positioned centrally in the slot of the link so that when the link is slid back and forth it forms a central guide cooperating with the sides of the drawhead which form outside guides.

The link operating rod 10 which connects with the eye 8 of the link extends downwardly through a slot 11 in the floor of the car 1 and then extends rearwardly as a lateral arm 12. A support 13 is fastened to the under surface of the car floor as by the bolt 14, 15. To this support is pivoted the lever 16 as at 17. The long arm of the lever connects to the rearmost portion of rod 12 which connection may be in the form of a hook 17' engaging an eye in the lever. In addition, support 13 is formed with an integral arm 18 which acts as a guide to insure that the lever 16 always swings in a horizontal plane. This guide 18 may be separate from support 13, if desired.

A swinging arm 19 is pivotally mounted as at 20, across the path of travel of link 5 and forwardly of lever 16. The free end of this swinging arm is provided with two perforations to permit rods 21 and 22 to pass therethrough. Rod 21 is fastened as at 43 to support 13. Between which end and the swinging arm 19 is disposed the compression spring 24 coiled about the rod so that if arm 19 be swung rearwardly toward lever 16, spring 24 will be compressed and will tend to return arm 19 forwardly. The rod 21 acts as a guide for the spring, and arm 19 also. Rod 22 connects at its rear end 25 to the short arm of lever 16, and a coiled spring 26 is disposed between a lug 27 on rod 22 and the free end 28 of arm 19. A cotter pin 29 prevents disengagement of rod 22 and arm 19.

This spring 26 forms a yielding connection between the link 5 and the swinging arm 19 which operates the link. For instance, when arm 19 is swung rearwardly, the free end 28 thereof contacts against the spring 26 and presses against lug 27 to shift rod 22 rearwardly which in turn swings lever 16 about its pivot to project the link 5 outwardly. If the link be thus in projected position, as in the case of a jamming of parts and a collision occurs, the link will be forced inwardly into the recess in the drawhead, rod 8 will be pushed rearwardly and will swing lever 16 about its axis so that the short arm will push rod 22 forwardly. But in the jammed position, the arm 19 is not free to swing forwardly, therefore, the outer end of rod 22 will slide through its hole in arm 19 and spring 26 will be compressed between lug 27 and the outer end of the immovable arm 19.

In order to permit projection of the link 5 from either side of the bumper 2, the swinging arm 19 is provided with two holes, preferably located in substantial alinement with the path of travel of the middle line of link 5, and plungers 30 and 31 are each pivotally connected by means of such perforations to this arm 19. These plungers are located in the form of a Y, extending on either side of the bolt 9 and are slidable in grooves or guides 32, 33 formed on the under surface of the under extension 34 of the base of the drawhead 3. Rods 30 and 31 also pass through holes in bumper 2, which holes form guides, assuring the correct positioning of the rods. Due to this angular disposition of the plungers 30 and 31, it will be manifest that the car, no matter at what angle it approaches, will operate the link.

In the modification of the invention disclosed in Figures 4 to 6, inclusive, the same result is accomplished by substituting for the two separate plungers 30 and 31 of the mechanism illustrated in Figures 1 to 3, a single plunger having a car contacting surface which extends for a substantial distance on each side of the path of travel of the link so that it can be operated on either side of a central line through the bumper. This provides a more rugged construction, especially capable of withstanding repeated coupling collisions.

In regard to the details of this construction, the car body 50 is provided with the usual bumper 51 and drawhead 52, the latter being recessed as at 53 and in a manner as heretofore described to house and guide the disappearing link 54, guided along its sides by the inner walls of the recess and centrally by the usual coupling pin 55.

The link shifting mechanism is mounted on the under side of the car body 50 by means of an attached support 56 upon which are pivotally mounted the lever 57 as at 58 and the forwardly disposed swinging arm 59 as at 60. Rod 61 connects link 54 to the long arm of lever 57 and rod 62 is connected to the short arm of lever 57. The opposite end of rod 62 passes through a hole in the free end 63 of arm 59 and a spring 64 is coiled between lug 65 on rod 62 and the free end of arm 63. A nut prevents arm 63 from sliding off rod 62. A second rod 65' is pivoted at 66 to arm 59 and slides through a slot 67 in support 56. A coiled spring 68 is compressed between arm 59 and the support 56. This spring returns arm 59 to outward position so that the plunger is normally projected outwardly.

In lieu of the two plungers which in the prior construction were pivoted to the central portion of swinging arm 59, there is provided a fan-shaped plunger 60'. That is, the outer or car contacting face of the plunger is fan-shaped so as to be substantially co-extensive with the possible car contacting zone of the bumper. This is preferably flat and slides in a similarly shaped slot 61' in the bumper 51. The inner portion of the plunger narrows to a flat rod shape 62' which pivotally connects at 63' with the central portion of the arm 59 preferably in line with the median axis of path of travel of link 54. The operation of this construction is identical with that previously described.

It is obvious that minor changes in the details of construction and the arrangement of the parts may be made without departing from the spirit of the invention as set forth in the appended claims.

Having thus described the invention, what I claim as new and desire to secure by Letters-Patent, is—

1. A coupler for mine cars and the like comprising a support, a coupling link shiftably mounted on said support whereby said link may be withdrawn within the support or projected beyond the support for coupling another car thereto, devices connected to said link and projecting beyond the bumper of the car when said link is withdrawn, said devices including yielding means whereby both the projecting devices and the link may be moved into said support at the same time.

2. A coupler for mine cars and the like comprising a support, a coupling link shiftably mounted on said support whereby said link may be withdrawn within the support or projected beyond the support for coupling another car thereto, devices connected to said link and projecting beyond the bumper of the car when said link is withdrawn, said devices including yielding means whereby both the projecting devices and the link may be moved into said support at the same time, and yielding means for normally holding said link withdrawn within said support.

3. A coupler for mine cars and the like comprising a support, a link shiftably mounted on said support, a lever pivoted on said support, a rod connecting said link and one end of said lever, a swinging arm pivoted to said support, a plunger projecting beyond the end of said car and having its inner end pivoted to said swinging arm, a rod connected to the other end of said pivoted lever and passing freely through a hole in the free end of said swinging arm, means to prevent said arm slipping off said rod, a lug on the opposite end of said rod, a spring coiled on said rod between said lug and the free end of said swinging arm, and means to force said swinging arm away from said lever.

4. A coupler for railway cars comprising a support, a link shiftably mounted thereon, a lever pivoted on said support, means connecting said link to one end of said lever, a swinging arm pivoted to said support, a car operated plunger pivoted to said swinging arm, means to swing said arm outwardly, and means connecting the outer end of said arm to the other end of said lever, said means acting to project said link on operation of said plunger.

5. A coupler for railway cars comprising a support, a link shiftably mounted thereon, a lever pivoted on said support, means connecting said link to one end of said lever, a swinging arm pivoted to said support, a car operated plunger pivoted to said swinging arm, means to swing said arm outwardly, and means connecting the outer end of said lever, said means acting to project said link outwardly on operation of said plunger and permitting the ingress of said link when said plunger is held from movement.

6. A coupler for cars comprising a coupling link mounted thereon and adapted to be projected beyond the bumper thereof, and withdrawn within the bumper, a lever arm carried by the car and devices connecting said lever arm to said link whereby the movements of said lever arm withdraw or project said link, a plurality of plungers connected to said lever arm substantially at the central longitudinal axis of the car and projecting beyond the bumper on opposite sides of said central longitudinal axis, whereby either plunger, when pushed upon, will operate to project the link, said devices connecting the lever arm to the link including yielding means whereby both the link and the plungers may be simultaneously withdrawn within the bumper.

In testimony whereof, I affix my signature.

FRANK W. HENRIKSON.